E. P. JOSLYN.
Thill-Coupling.
No. 226,452.
Patented April 13, 1880.
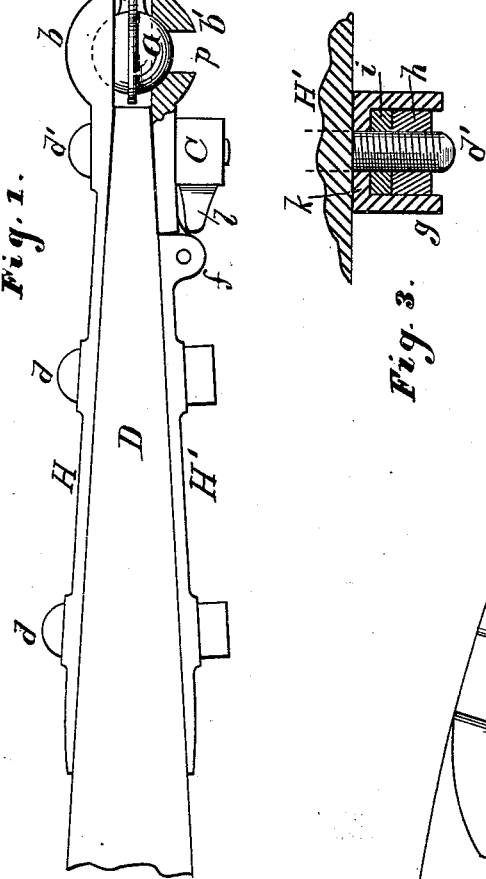
Attest:
Henry E. White.
W. N. Phillips.
Inventor:
Elias P. Joslyn.
By E. B. Whitmore, Atty.

UNITED STATES PATENT OFFICE.

ELIAS P. JOSLYN, OF BROCKPORT, NEW YORK.

THILL-COUPLING.

SPECIFICATION forming part of Letters Patent No. 226,452, dated April 13, 1880.

Application filed January 9, 1880.

*To all whom it may concern:*

Be it known that I, ELIAS P. JOSLYN, of Brockport, in the county of Monroe and State of New York, have invented a new and useful Improvement in Thill-Couplings, which improvement is fully set forth in the following specification and accompanying drawings, in which—

Figure 1 is a plan; Fig. 2, a side elevation, and Fig. 3, a detail.

The object of my invention is to produce a new thill-coupling for light vehicles that shall be noiseless, adjustable, and easily detachable.

In the drawings, A is the axle; B, the stock resting upon the same; F, a clip binding said axle and stock together; D, the thill, and H H' metallic straps tipping the end of the thill and held to the same by bolts $d\ d\ d'$, all being parts of a light wagon or road-vehicle.

The forward end of the tie G of the clip terminates in a sphere, $a$, and the rear ends of the straps H H' terminate in hemispherical parts or "spoons" $b\ b'$, which have their inner opposing faces concaved to fit the sphere, and when brought to place grasp and partially cover the same, as shown.

$c$ is a vertical web encircling the sphere and extending back to the body of the tie G, for the purpose of stiffening the neck $e$ of the tie.

The spoon $b'$ is connected to the strap H' by a joint, $f$, of common form, by means of which the said spoon may be swung back or open when the thill is to be attached to or detached from the vehicle.

A bolt, $d'$, provided with a nut, C, passes through the straps near the spoons and through the tip of the thill-wood D, and when the spoons are closed upon the sphere and the nut screwed up to place a firm and secure junction is effected between said spoons and sphere.

The opposite faces of the thill-wood, near the end and in the vicinity of the bolt $d'$, covered by the straps, are slightly cut away, so that the spoons may come to a bearing upon the sphere first, and before the wood is pinched, when the nut C is screwed up. This allows, when the sphere and spoons become worn and loose, of the nut being further tightened, thus rendering the bearing between the spoons and the sphere adjustable.

The nut C is composed of several parts, as follows: $g$ is a shell or cup containing a square inclosure having a bottom plate, $k$, which serves as a washer for the bolt $d'$, up through the middle of which the said bolt extends when the parts are put together, as shown in Fig. 3. $i$ is a cushion fitting the interior of the cup-washer $g$, with a central orifice to receive the bolt, made of india-rubber or some other suitable yielding substance, (it may be a spring;) and $h$, a nut proper for the bolt $d'$, threaded upon the same and fitting within the cup, as shown.

The cup $g$, nut $h$, and cushion $i$ all turn together, and the former, being square, is adapted to be turned by an ordinary wrench for turning bolt-nuts, and when turned in the direction to carry the nut $h$ onto the bolt the cushion or buffer $i$ will be compressed between the nut and bottom of the cup. There is no friction or motion between the surface of the nut and the surface of the cushion, the latter being simply pressed by the former, and the elasticity of the cushion gives to the spoons $b$ and $b'$ a yielding instead of a positive gripe upon the sphere $a$. By this means a snug contact is always maintained between the spoons and the sphere, which effectually prevents rattling or other noise, and at the same time the yielding of the cushion is so slight that the spoons can in no case be drawn off the sphere.

The cup $g$ has a finger or bar, $l$, extending out from one of its sides, which, as the cup is turned to a certain position, comes in contact with and rubs upon the raised portion of the joint $f$, which tends to check or obstruct the motion of said cup with the contained nut and cushion, forming, in fact, a lock for said nut. The exertion of the elastic cushion $i$, when the same is pressed by the nut, tends to hold the cup $g$ against the part H' with a uniform pressure, and compensates for any slight variations in the length of the bolt $d'$, caused by changes of temperature, or variations in the thickness of the parts held between the nut C and the bolt-head, caused by the shrinking and swelling of the wood of the thill by dryness or moisture. This yielding but constant pressure of the bottom of the cup against the strap or part H' tends to keep the cup and nut from turning, and, in fact, constitutes another lock for the nut $h$.

To attach the thill to or detach it from the vehicle it is only necessary to unscrew the nut C sufficiently to allow the spoons to be removed from the sphere a.

I claim as my invention—

1. The combination of a ball, a, of a wagon-clip and thill-spoons b b', the latter being held against the former in a yielding manner by means substantially as described.

2. A bolt, d', provided with a lock-nut, C, in combination with the spoon-shaped thill-straps H H' and thill D, substantially as shown.

3. The combination of the axle A, clip F, with its ball or sphere a, straps H H', with their spoon-shaped ends b b' and joint f, bolt d', and lock-nut C, all arranged substantially as shown and described.

ELIAS P. JOSLYN.

Witnesses:
E. B. WHITMORE,
H. L. BENNETT.